Fig. 5.

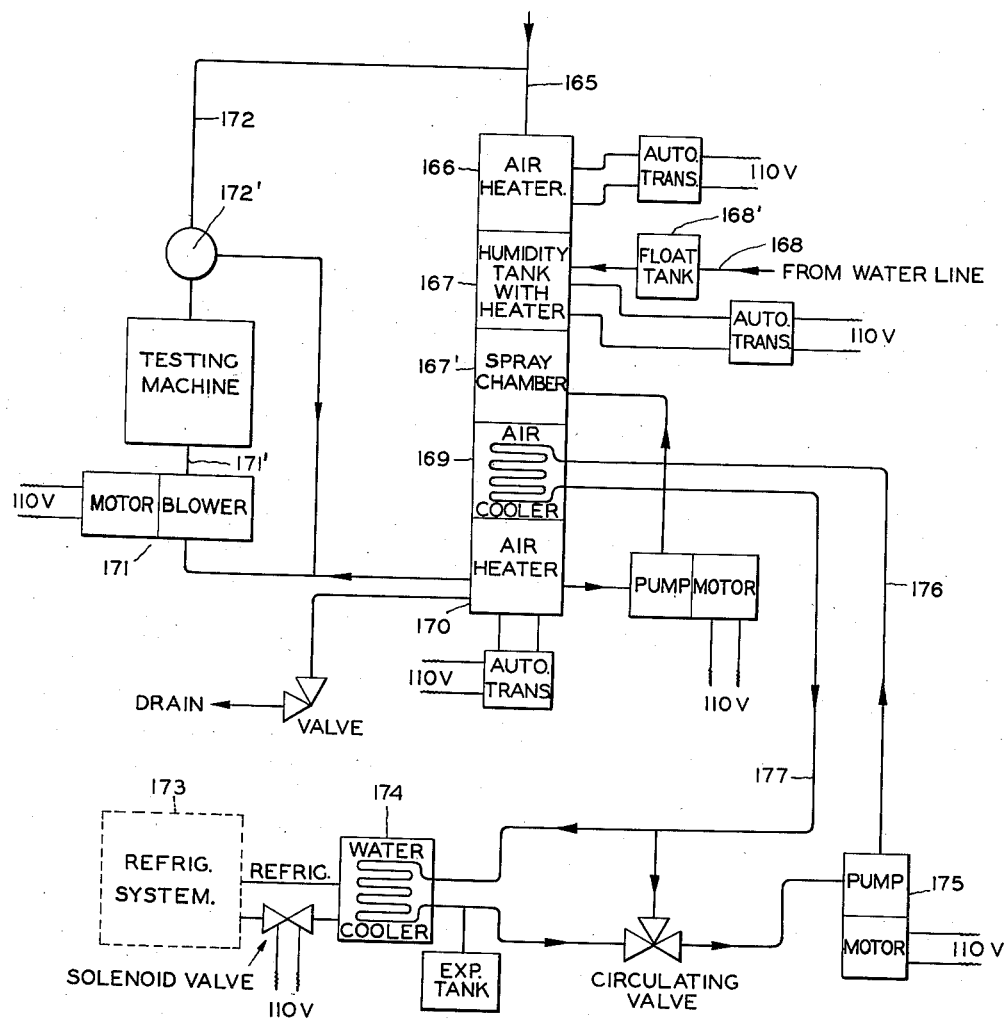

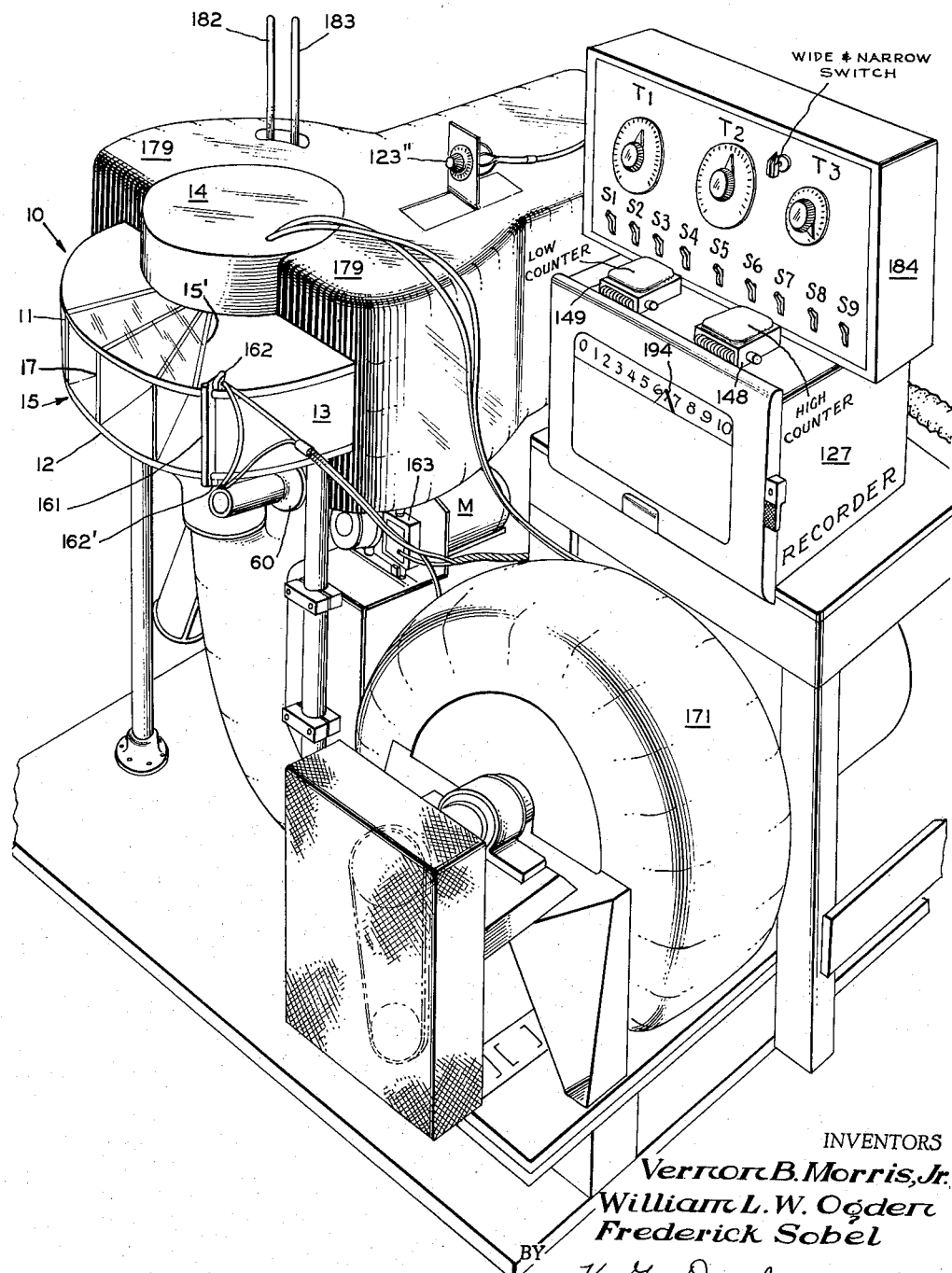

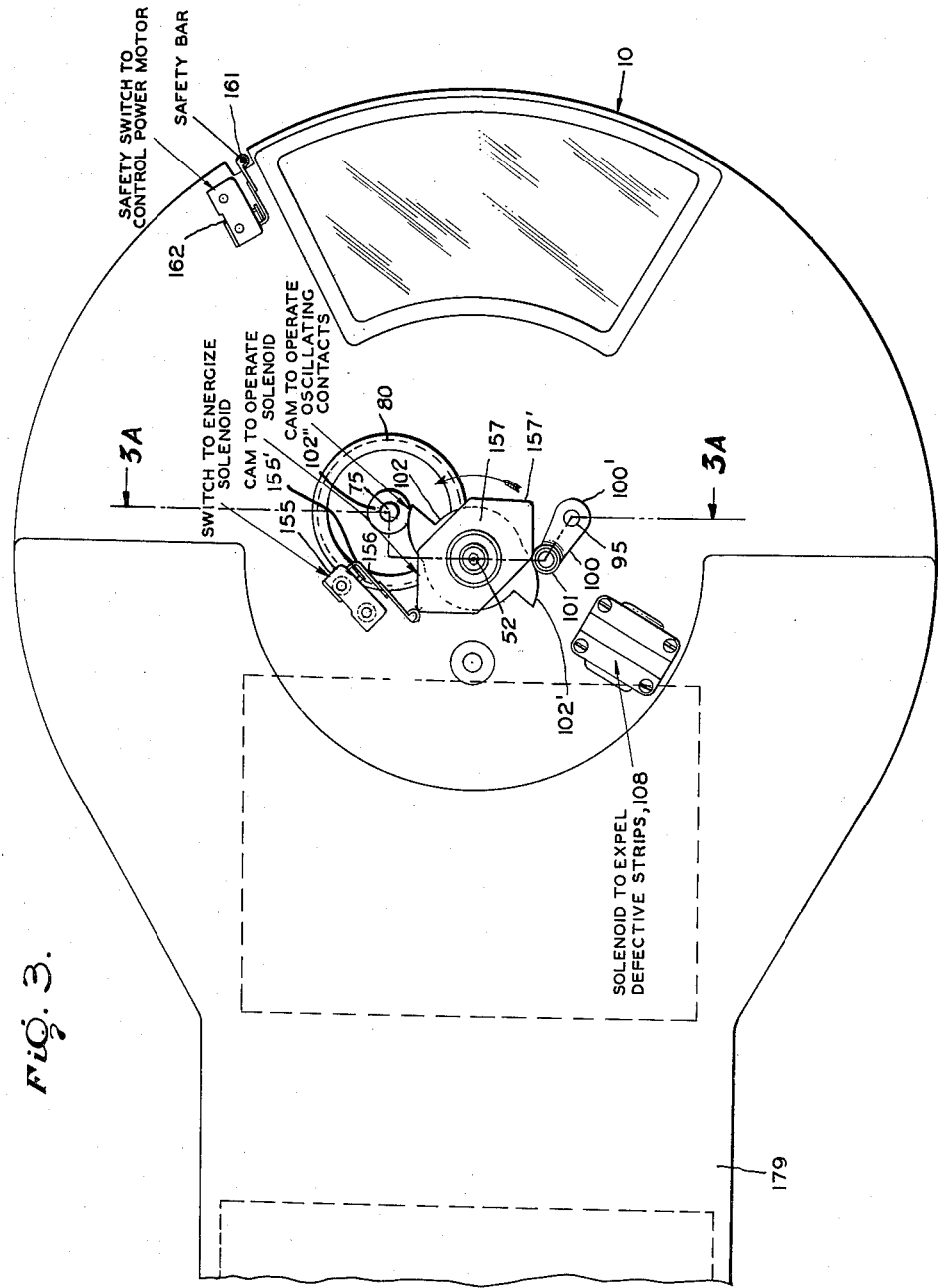

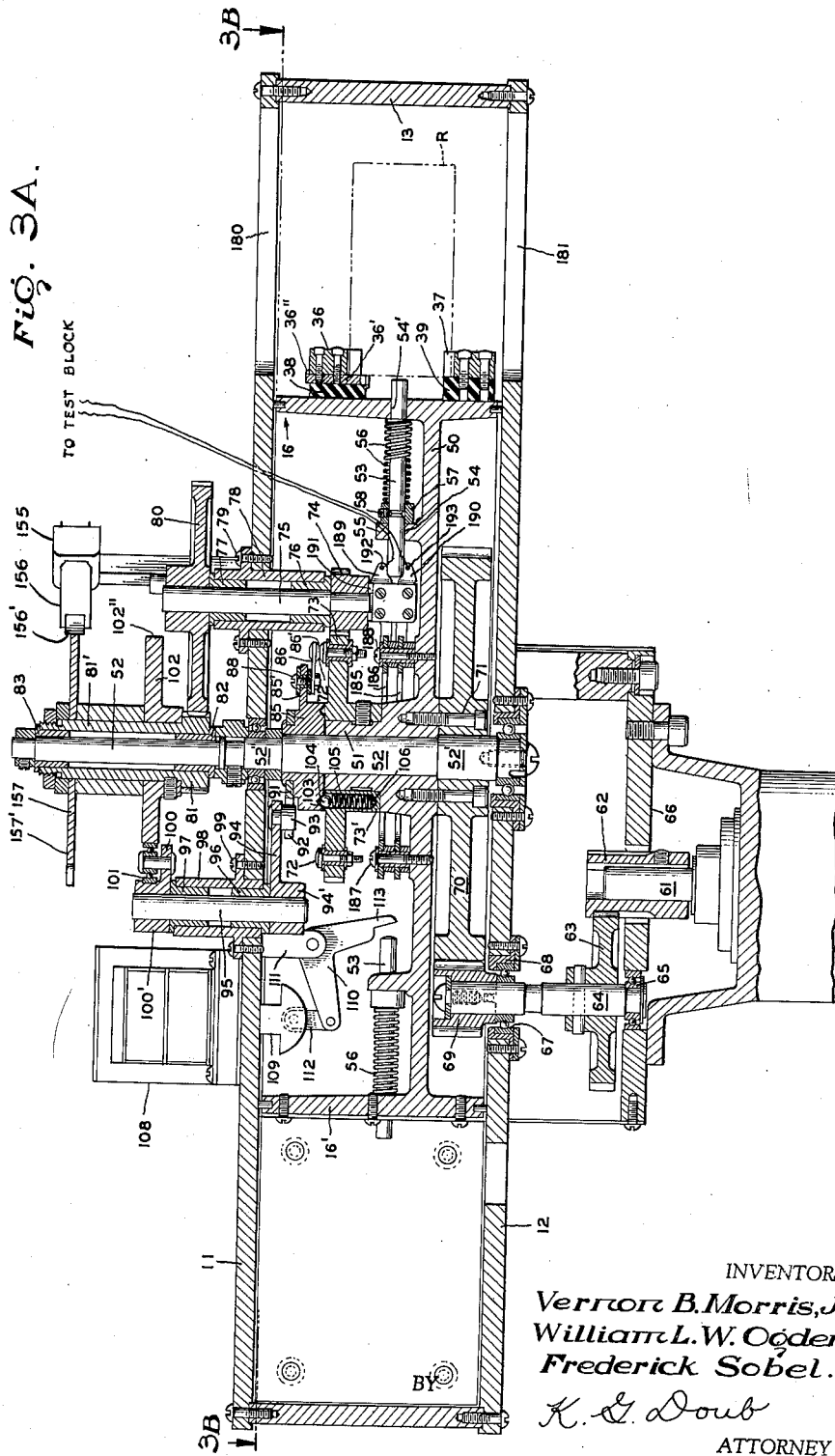

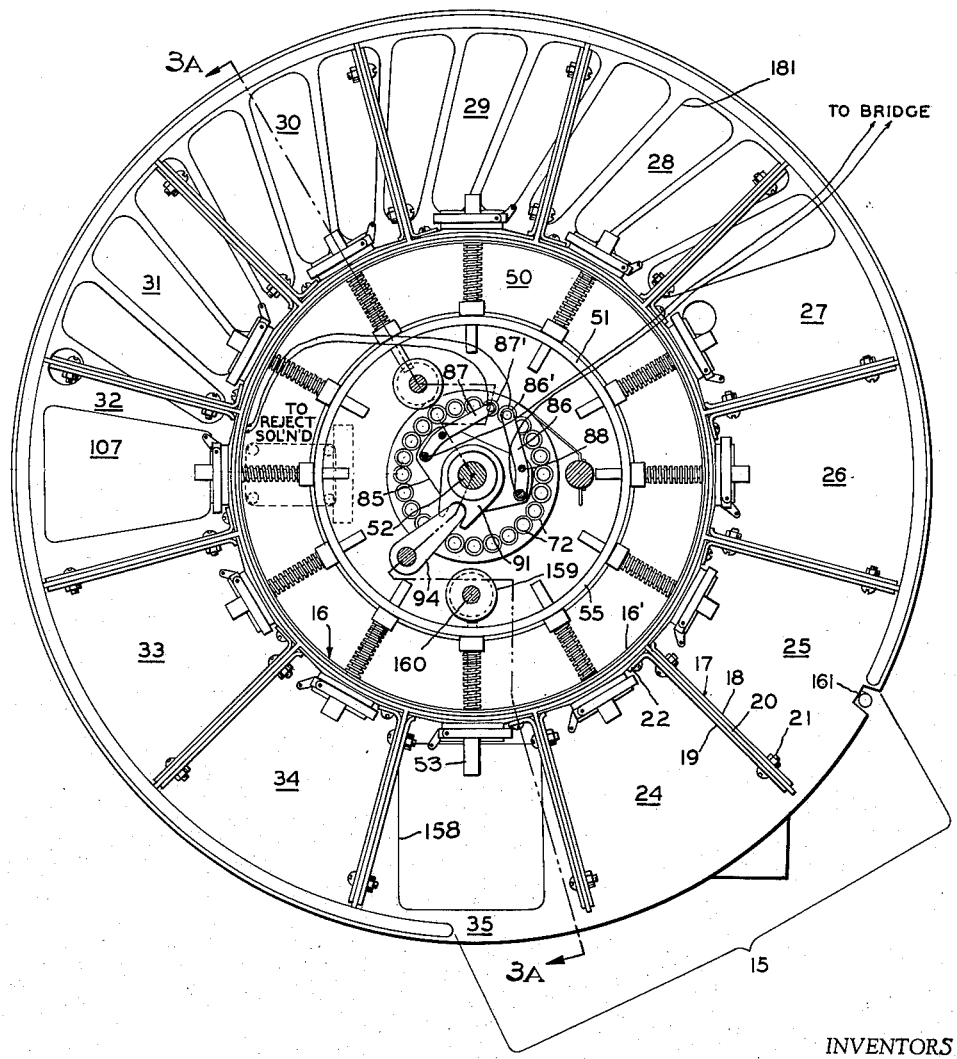

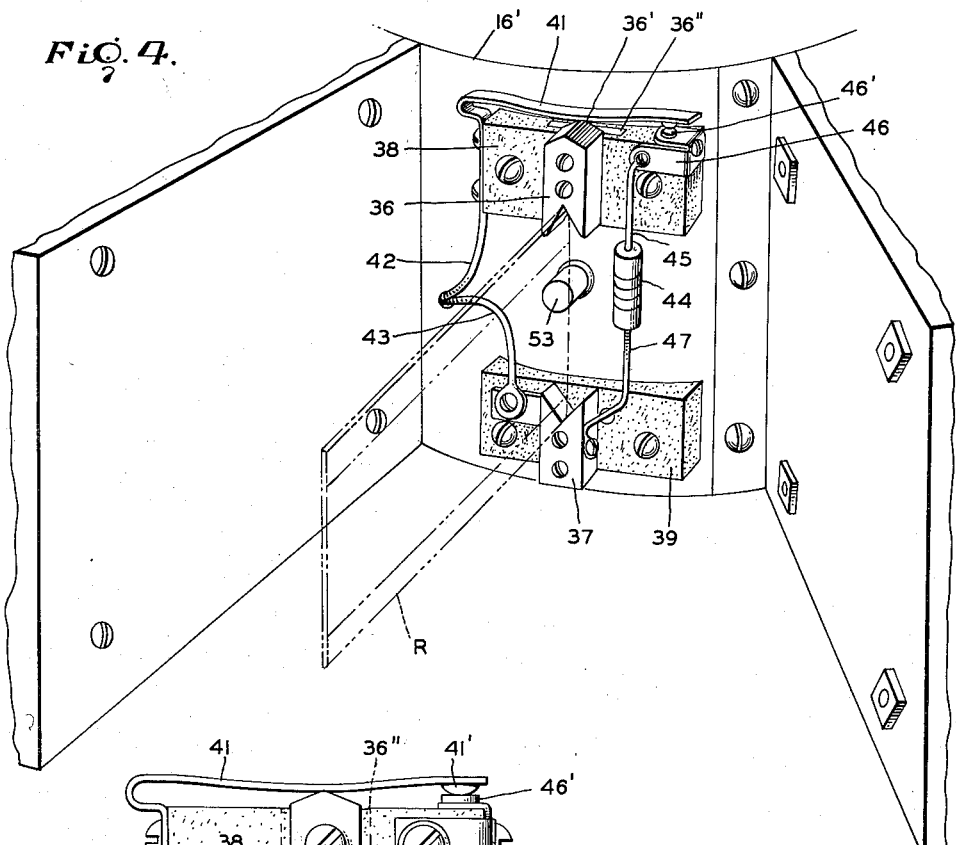
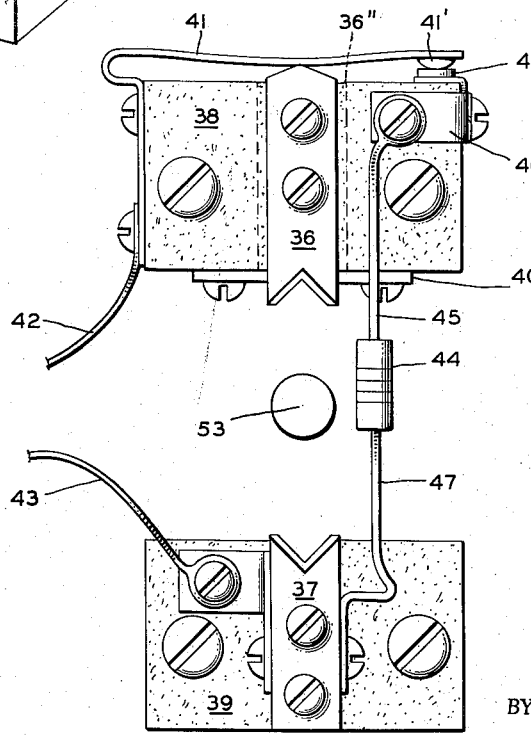
Fig. 4.
Fig. 4A.
INVENTORS
Vernon B. Morris, Jr.
William L. W. Ogden.
Frederick Sobel.
BY K. G. Doub
ATTORNEY INVENTORS
Vernon B. Morris, Jr.
William L. W. Ogden.
Frederick Sobel.
BY K. G. Doub
ATTORNEY

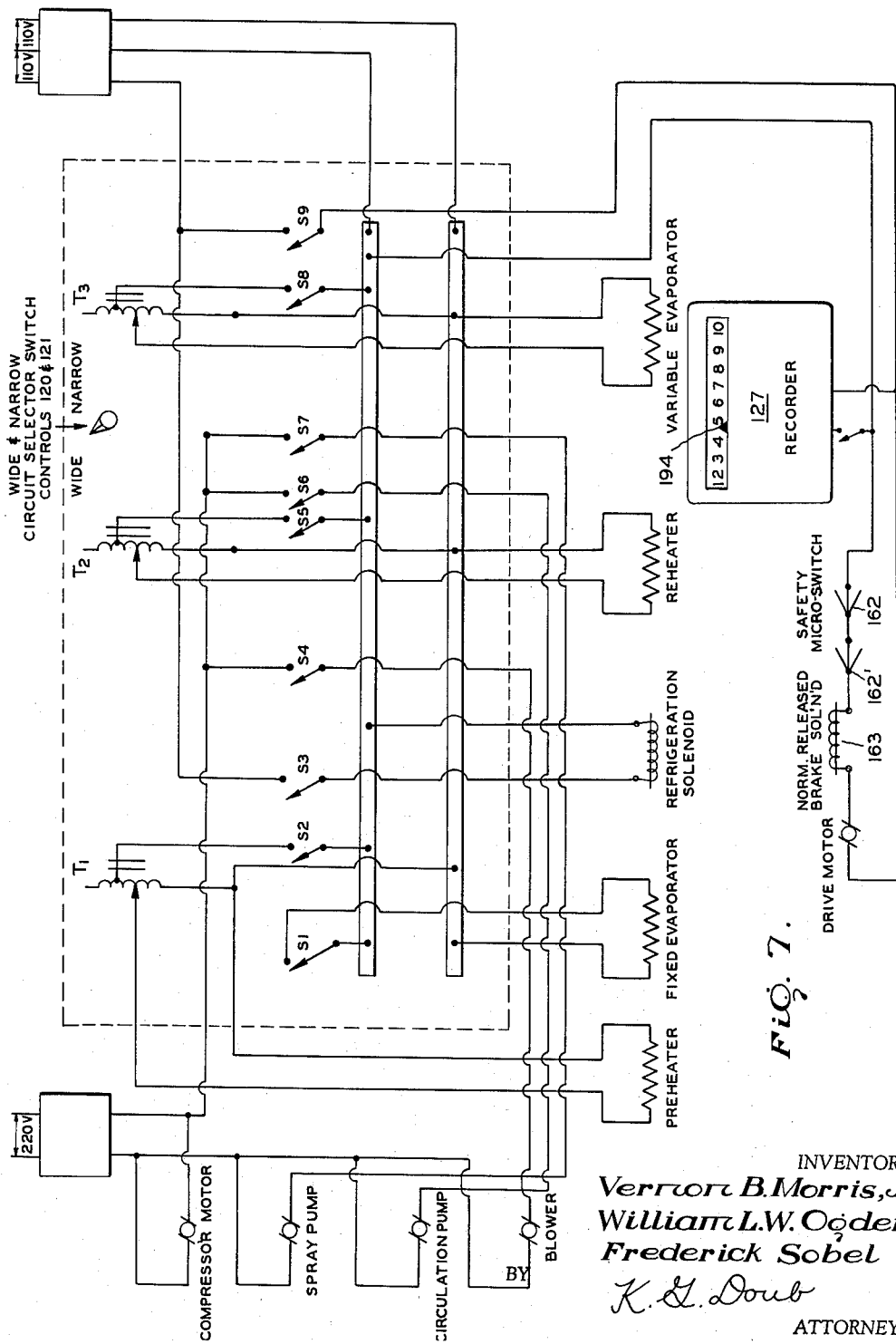

United States Patent Office 2,978,102
Patented Apr. 4, 1961

2,978,102

APPARATUS FOR TESTING AND SORTING HUMIDITY-RESPONSIVE ELECTRICAL RESISTOR OR HYGROMETER

Vernon B. Morris, Jr., William L. W. Ogden, and Frederick Sobel, Baltimore, Md., assignors to The Bendix Corporation, a corporation of Delaware Filed Aug. 10, 1954, Ser. No. 448,962

20 Claims. (Cl. 209—81)

The resistance elements for which the apparatus of the present invention was particularly devised are of the humidity sensitive type; they make take the form of a thin flat strip, note Fig. 4 wherein one of such elements is indicated at R. For the sake of brevity, these elements may be conveniently termed "humidity strips." The element may be comprised of a base strip of polystyrene material, coated on both sides with a film of resistive substance, such as lithium chloride, carbon or the like, whose resistance varies as a function of the humidity of the ambient atmosphere; and along the edges of the base strip are located a pair of electrodes, which may consist of conductive metallic coatings. When a resistor of this type is connected in the relaxation circuit of a radiosonde transmitter, variations in resistance due to changes in humidity will correspondingly vary the audio frequency of the oscillator, to in turn modulate the radio frequency carrier wave of the transmitter. These resistors must fall within certain specifications as to their so-called "nominal value" of resistance and which value may be ascertained by reading the resistance in ohms when the resistor is subjected to a substantially constant voltage at a given temperature and relative humidity. Heretofore, as far as known, it has been the practice to test such elements by inserting each element in a suitable measuring circuit separately and reading the resistance on an indicator. This method is not only expensive due to use of trained personnel and low production per man-hour, but it is also subject to errors due to the human factor involved.

The apparatus forming the subject matter of the present invention utilizes a rotatable carrier, partitioned off into a plurality of test chambers, which are maintained at a predetermined substantially constant temperature and humidity, the said chambers being successively exposed to a loading station, at which point an operator inserts a resistor between a pair of gripping jaws, also functioning as conductors, which hold the strips while the jaws are inserted in an electrical test circuit. If the resistance of the element falls within a certain plus or minus range, or an acceptable range, the element is "accepted" by the machine and deposited in a suitable receptacle therefor, whereas if the resistance of the element is below or above the acceptable range, the element is automatically rejected and deposited in another receptacle. Provision is made for avoiding damage to the relatively sensitive element, and during the entire test the element is not handled manually except when loaded into the test chamber. Furthermore, operation of the machine does not require technically-trained personnel.

The various objects and advantages of the improved testing apparatus will be more fully brought out and described in the following description taken in conjunction with the accompanying drawings, wherein:

Fig. 1 is a block diagram of apparatus for testing and sorting humidity-responsive resistors in accordance with the invention;

Fig. 2 is a perspective view of that portion of the apparatus concerned primarily with the actual testing and sorting of the resistors;

Fig. 3 is a plan view of the resistor strip testing machine, with the top center cover thereof removed;

Fig. 3A is a vertical offset section taken approximately on line 3A—3A, Fig. 3 down to but not including the top frame plate 11 and on line 3A—3A, Fig. 3B including and below said top plate;

Fig. 3B is a horizontal section taken substantially along the line 3B—3B, Fig. 3A;

Fig. 4 is an enlarged perspective view of one of the so-called test chambers, showing one of the resistors in place between the gripping jaws or holders therefor;

Fig. 4A is a detail view of the gripping jaw assembly;

Fig. 5 is a schematic view of part of the control mechanism and associated electric circuitry;

Fig. 7 is another circuit diagram of the main electrical control system.

Figure 4B:
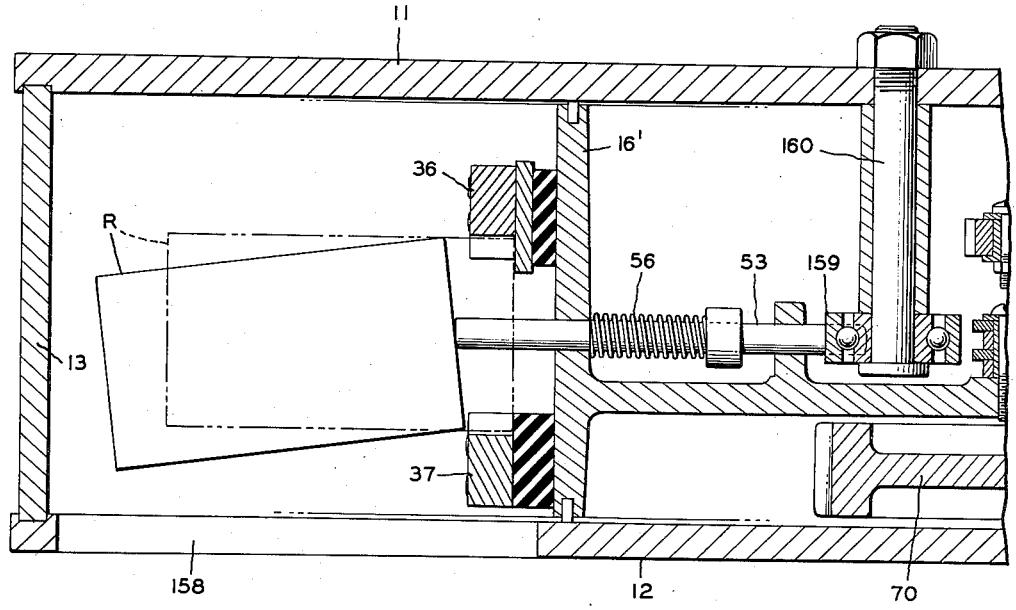
Fig. 4B is a detail view of the ejector for humidity strips which pass the "acceptance" test.

The resistor strip testing machine is generally indicated at 10, compare Figs. 2, 3, 3A and 3B; in the form shown it comprises a main stationary housing made up of a top plate 11 and a bottom plate 12, rigidly connected in vertically spaced relation by suitable means including an outer peripheral ring or wall 13. A removable top central cover 14 is provided for certain cam and switch mechanism, to be explained. By reference to Fig. 3B it will be noted that the outer wall is open at 15 to provide a loading station, at which point an operator stands when loading the resistors into the machine; and the top plate 11 is provided with a window 15' at said station, see Figs. 2 and 3. A centrally-located rotatable carrier is generally indicated at 16; it includes a rotor ring 16' which is driven in a manner to be explained. Connected at their radially-inner edges to the rings 16' are a plurality of radially-projecting partition wings 17, which are of similar construction throughout, each comprising a pair of side plates 18 and 19 and an intermediate sealing strip 20, the side plates being clamped together on opposite sides of said strip by means of bolts 21, one of said plates being formed with an outturned flange 22 which is rigidly secured to the ring 16'. These partition wings 17 define a series of test chambers 24, 25, 26, 27, 28, 29, 30, 31, 32, 33, 34 and 35, which are constantly rotating while the machine is in operation and carrying the resistors to be tested therewith. Between each pair of partitions 17 and connected to the rotor ring 16' are a pair of upper and lower gripping jaws 36 and 37, note particularly Figs. 4 and 4A. The upper jaw 36 is rigidly connected to a runner block 36' having side runners or ribs 36", which dove-tail into coacting recesses formed in an insulated block 38, secured to the ring 16', while the lower jaw 37 is affixed to another insulated block 39, also secured to said ring. Thus the upper jaw is mounted for vertical sliding movement with respect to the lower jaw. Each of the jaws is formed with a recess, in this instance V-shaped, to receive and engage the opposite edges of a resistor element, one of which is indicated at R.

The upper jaw is limited in its downward movement by a stop plate 40, note Fig. 4A, which is secured to the bottom of block 38 and engages the side runners 36" at the "down" position of said jaw; and this jaw is normally urged toward a downward or gripping position by means of a spring 41, which is shown as of the leaf spring type and combines the functions of both a spring and electrical conductor and contact member, the latter being indicated at 41'. The conductors or cables indicated at 42, 42' and 43 comprise part of a bridge circuit, compare Fig. 4 with Fig. 6, and the member 44 represents a resistor which is in parallel with the jaws and which serves as a bridging resistance when there is no strip between said jaws, as will be more fully hereinafter explained. The resistor 44 is connected by wire 45 with a terminal member 46, which is secured to block 38 and is provided with a contact 46'; and said resistor 44 is also connected by wire 47 to the lower jaw 37. This resistance element 44 is preferably of a value which lies substantially intermediate the maximum and minimum "acceptable" values of the humidity strip to be tested. In practice and purely by way of example, a resistor 44 for wide strips had a value of 20,000 ohms, while a resistor 44 for narrow strips had a value of 7,000 ohms. Since it is of a resistance substantially equal to that of the strips which are interposed between the jaws for test purposes, if it is put in circuit when a strip is removed from the jaws it will prevent the circuit from swinging to a high unbalance when the jaws are unloaded. As will be apparent from Figs. 4 and 4A, when a strip is placed between the jaws as in Fig. 4, contact 41' is separated from 46', cutting resistor 44 out of the bridge circuit, and when the strip is removed as in Fig. 4A, the said contacts close, and the resistor is again inserted into said circuit.

In cases where a run of resistor elements to be tested are each of a width too wide or too narrow to fit between the upper and lower jaws 36 and 37, the latter may be conveniently removed and replaced by jaws of different over-all lengths.

The rotor ring 16' which forms part of the rotatable carrier assembly, see Figs. 3A and 3B, is formed on the periphery of a web plate 50, the latter in turn having a central upstanding hub 51, which is mounted for rotation on a central shaft 52, having stepped portions 52' and 52". A plurality of radially movable ejector plungers 53 slidably project through aligned holes 54 and 54' provided, respectively, in an upstanding flange 55, formed on the plate 50, and in the rotor ring 16'. A spring 56 is inserted over each of the plungers 53, between the rotor ring 16' and an abutment collar 57, provided with a set screw 58, said collar limiting the inner or non-ejecting position of the plunger 53. The plungers 53 serve to eject resistor elements, and the manner in which these plungers operate will be subseqeuntly described.

The drive on the rotor assembly is powered by a motor M, note Fig. 2, which acts through a suitable gear reduction unit 60 to drive a vertically projecting shaft 61, compare Figs. 2 and 3A. Shaft 61 has secured thereon an elongated pinion 62, in mesh with a gear 63, secured on a shaft 64, the latter at its lower end being journaled in bearings 65, mounted in a base plate 66, and at its upper end in bearings 67, carried by a retainer 68, secured to the bottom plate 12 of the main housing. The upper end of the shaft 64 has secured thereon a pinion 69, which is in mesh with a gear 70, mounted for rotation on the enlarged portion 52' of the shaft 52 and secured by screw bolts 71 to the hub portion of rotor ring web plate 50.

Figure 6:
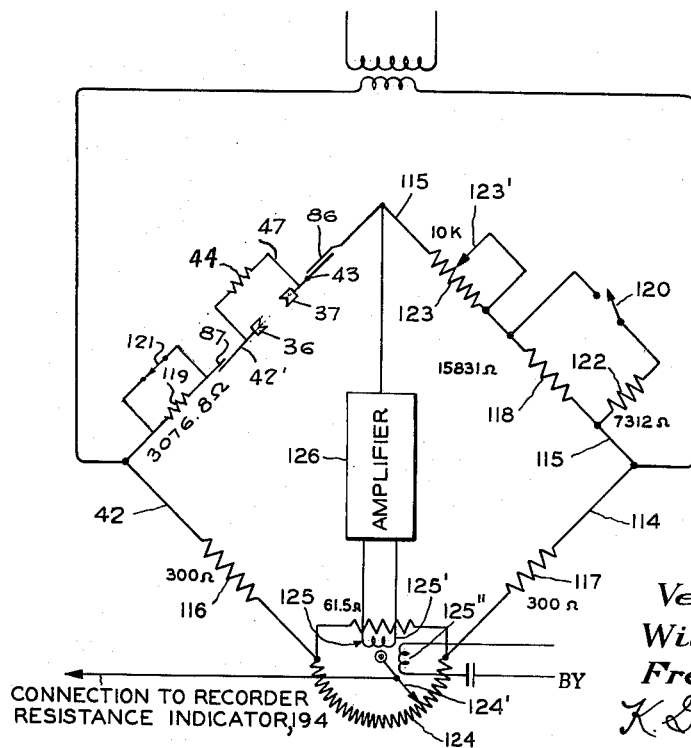
Fig. 6 is a circuit diagram of a bridge-type testing circuit.

In order to interpose the resistance strips to be tested into the bridge circuit of Fig. 6, a plurality of contacts 72, best shown in Figs. 3A and 3B, are secured on the radially outer portion of a gear 73, revert to Fig. 3A, having a hub 73', which is adjustably secured on a reduced portion of the hub 51. The gear 73 is in mesh with a pinion 74, drivingly secured on the lower reduced end of a shaft 75, rotatable in bushings 76 and 77, the latter in turn being mounted in a spacing and supporting sleeve 78, having a radial flange by means of which the sleeve is connected to the upper housing plate 11, as by screws 79. On the upper end of the shaft 75 is secured a driven gear 80, in mesh with a pinion 81, having an elongated upstanding hub or sleeve 81', which is provided with spaced bushings 82 and 83, mounted on the upper extremity of shaft 52.

By referring to Fig. 3B, it will be noted that there are twenty-four of the contacts 72, a pair for each set of upper and lower jaws 36 and 37, the contacts being connected to said jaws by the wires or conductors 42 and 43 referred to in connection with Figs. 4 and 4A. As the carrier rotor 16 rotates, it carries the gear 73 around with it and hence the contacts 72 carried by said gear. Immediately above the gear 73 and riding thereon is an oscillating contact member in the form of a bearing plate 85. A pair of spring contact arms 86 and 87 are secured, as by screw bolts 88, to the reduced projecting portions 85' of said plate, said arms carrying contacts 86' and 87' on the outer free ends thereof, which are adapted to engage a complemental pair of contacts 72 and move therewith through a certain number of degrees of rotation of the carrier, at which time the upper and lower jaws of one of the test chambers 24—35 and the humidity strip carried thereby are electrically connected into the bridge circuit of Fig. 6. Upon completion of the test, the contacts 86' and 87' are moved back and engage a succeeding pair of contacts 72 to repeat the cycle. In order to bring this about, the plate 85 must be continually oscillating in phase with the rotary travel of the carrier 16. The mechanism for accomplishing this action comprises a Geneva plate 91, which is secured to the upper necked portion of the plate 85, the plate 91 having a radially projecting portion formed with an open recess 92, in which a cam roller 93 is adapted to ride, said roller being carried by an arm 94 projecting radially from a hub 94', secured on the lower end of a shaft 95, which is rotatably mounted in bushings 96 and 97, carried by a sleeve 98, formed with a radial flange by which it is connected to the upper housing plate 11, as by screws 99. Secured on the upper end of shaft 95 is a hub 100', having a radially projecting arm 100, the latter carrying a roller 101, adapted to be engaged by cams 102' and 102", formed on a plate 102, having a hub which is adjustably secured on the sleeve 81' extending upwardly from the pinion 81.

To releasably connect the contact-carrying plate 85 to the gear 73, the underside of said plate is formed with a plurality of detent notches 103, note Fig. 3A, one for each set of complementary contacts 72, in which a detent in the form of a ball 104 successively engages, said ball being urged into detent engagement by a spring 105, seated in a bore 106, formed in the hub 73' of the plate 73.

If reference is made to the top plan view in Fig. 3 in connection with the sectional view of Fig. 3A, it will be noted that the arm 100, which is secured on the upper end of the shaft 95, can never rotate past a given dead center in a clockwise direction due to the contour of the cam plate 102, so that when the roller 101 carried by said arm is contacted by the cams 102' and 102", the shaft 95 will be partially rotated in a counter-clockwise direction.

It will be seen that as the carrier rotor 16' is rotated, the gear 73 is caused to rotate therewith. Assuming that in operation, the drive on the rotor is counter-clockwise, as the gear 73 rotates, the contact-carrying plate 85, being releasably connected to said gear by detent 103, will be carried around with the gear until the said plate is held against further rotation by the arm 94, carrying the roller 93, riding in the notch or recess 92 of the Geneva plate 91, and which arm can never rotate in a clockwise direction beyond a certain point due to the limiting action of the cam plate 102 with respect to the 100. Approximately at this time, one of the cams 102' or 102" contacts the roller 101 and produces a partial turn of the shaft 95 in a counter-clockwise direction, and this results in a partial reverse rotation of the Geneva plate 91, and hence the contact-carrying plate 85 in a clockwise direction to a point where the contacts 86' and 87' move back and pick up a succeeding set of contacts 72. Since the cam plate 102 makes six complete revolutions for each revolution of the carrier, and since said cam plate carries two cams 102' and 102", the contact-carrying plate 85 will be oscillated twelve times for each complete revolution of the carrier; and during each oscillation, the contacts 86' and 87' will engage a complementary set of contacts 72 (one for each upper and lower jaw 36 and 37) and rotate therewith through 30° of rotation of the carrier plate and then move back through 30° and pick up a succeeding set of contacts 72.

Should any of the humidity strips being tested show a resistance which is greater or less than predetermined "nominal" or "passing" resistance value, the strip is automatically ejected from the gripping jaws 36 and 37 and dropped down through an opening 107 in the lower base plate 12 into a suitable container provided therefor. The mechanism for accomplishing this purpose comprises an ejector solenoid 108, note particularly Figs. 3A and 5, which is provided with an armature 109, normally in a "down" position as viewed in said figures. An ejector member in the form of a bell crank lever 110 is pivotally supported, as by bracket 111, from the upper plate 11 of the machine, and has one of its arms pivotally connected, as by link 112, to the lower end of the armature 109 and its other arm provided with a cam end 113, adapted to engage any one of the ejector plungers 53, heretofore described, when the bell crank is rocked in a clockwise direction due to energization of said solenoid.

Figure 5:
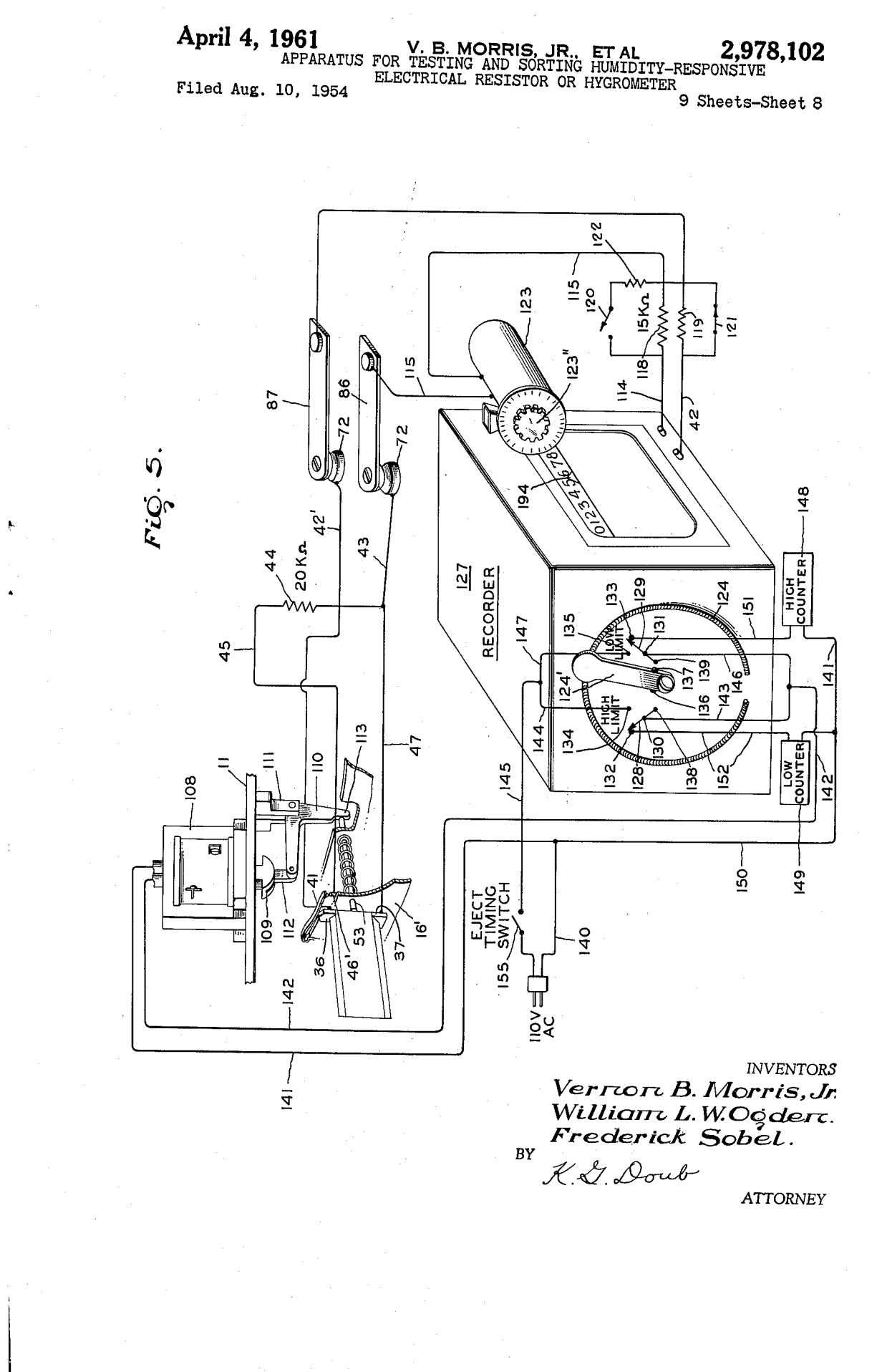

The electrical circuitry for controlling the solenoid 108 is best shown in Figs. 5 and 6. The bridge circuit of Fig. 6 comprises, in addition to the jaws 36 and 37 and the conductors 42 and 43 heretofore noted, which make up two arms of the bridge, a pair of arms 114 and 115. A pair of fixed balancing resistors 116 and 117, which may be of equal value, are interposed in the arms 42 and 114. The resistor indicated at 118 is for use in testing wide humidity strips, and that at 119 is for use in testing narrow strips; these are provided with by-pass circuits incorporating switches 120 and 121 for selectively interposing either one or the other in the bridge circuit at the will of an operator. The switches 120 and 121 preferably have a common control or are of the gang type, note the control box at the top of Fig. 2. The resistor 122, associated with the by-pass circuit of the wide strip resistor 118, facilitates balancing of the circuit when narrow strips are to be tested. A potentiometer 123, having an arm 123' controlled by a knob 123", note Fig. 5, provides a convenient adjustment for bringing the bridge circuit back to balance when the circuit becomes unbalanced during operation of the machine due to variations in humidity and/or temperature of the air or other causes.

A slide wire balancing resistance or potentiometer 124 is connected between the arms 42 and 114 of the bridge circuit and has an arm 124', controlled by a two-phase balancing motor 125, provided with field windings 125' and 125", the winding 125' being the control winding and the winding 125" being displaced 90° in phase with respect to said control winding.

The operation of the bridge circuit will be obvious. The various resistances interposed in the arms of the bridge are of a value such that when a humidity strip having a given nominal value is inserted between the jaws 36 and 37, the bridge will remain in balance, or any unbalance will be insufficient to produce a voltage beyond a predetermined magnitude, which is gauged in the light of the acceptance tolerance range of the strips. The alternating voltage created by an unbalance of the bridge is applied to the input of the amplifier 126 and greatly amplified. This amplified unbalance voltage is then impressed on the control winding of motor 125, causing it to rotate the arm 124' of potentiometer 124, the direction of rotation of said arm being determined by the direction of flow of current in the control winding which in turn depends upon the direction of unbalance, i.e. whether it is "high" or "low." If reference is had to Fig. 5, it will be observed that should arm 124' rotate in either direction beyond a certain range, it will contact either one or the other of switches 128 and 129, which along with the test bridge and amplifier form part of the circuitry contained within the recorder box 127 of Figs. 2 and 5. The limit switch 128 is pivoted on a terminal 130 and the limit switch 129 on a terminal 131. The switches are normally urged to the positions shown in Fig. 5, at which time they are in engagement with terminals 132 and 133, and when they are in their alternate positions, they engage terminal contacts 134 and 135. The radially inner extremity of potentiometer arm 124' is provided with contact members 136 and 137, adapted to engage coacting members 138 and 139 carried by the said limit switches when the arm rotates in either direction beyond the allowable or tolerance range. Should the arm rotate in a counter-clockwise direction to a point where it closes the high limit switch 128, for example, and assuming ejector timing switch 155, to be described, is also closed, a circuit will be completed from the supply line to the solenoid 108 by way of wires 140 and 141 and thence to the return side of the line by way of wires 142 and 143, switch 128, which will then bridge terminals 130 and 134, and wires 144 and 145. Closing of the low limit switch 129 will complete the solenoid circuit in a like manner, except that in this instance current will flow from wire 142 to wire 145 by way of wire 146, switch 129 and wire 147, the latter switch at this time bridging terminals 131 and 135.

Suitable "high" and "low" counters 148 and 149 are wired in parallel in the solenoid circuit in a manner such that each time the circuit to the solenoid is completed, one of the counter circuits will also be completed. Thus, should the high limit switch 128 be closed, a circuit to the high counter 148 will be completed from the line supply by way of wires 140 and 150, to and through counter 148, and return by way of wire 151, low limit switch 129, wires 146 and 143, high limit switch 128 and wires 144 and 145 (assuming that the ejector timing switch 155 is closed). Should the low limit switch 129 be closed, then a circuit will be completed from the line supply by way of wires 140 and 150, to and through counter 149, and return by way of wire 152, high limit switch 128 and wires 143 and 146, low limit switch 129 and wires 147 and 145 (again assuming ejector switch 155 is closed).

It is important that the solenoid 108 be not energized (assuming the strip to be tested is above or below the passing range) until the test has been completed, or until the strip undergoing test has been subjected to the bridge circuit for the allotted length of time, since there may be variations in resistance sufficient to unbalance the bridge beyond the "passing" potential while the test is in progress and prematurely trip the ejector lever 110 into the path of the oncoming ejector plungers 53. To avoid this, means are provided for timing the action of the solenoid 108, such means comprising a normally-open ejector timing switch 155, note particularly Figs. 3, 3A and 5, having a depressible contact member 155', controlled by a spring arm 156, carrying a follower roller 156' on the free extremity thereof adapted to be engaged by ejector timing cams 157', carried by a cam plate 157, secured on the upper extremity of the sleeve 81' which constitutes an extension of the hub of pinion 81, heretofore described.

As the cam plate 157 rotates, the cams 157' successively engage the roller 156' and close the ejector timing switch 155 at the completion of each test. Hence, the circuit to the solenoid 108 will not be completed even though either one or the other of the high or low limit switches is closed, until the strip to be tested has passed through the bridge circuit.

The "passing" strips undergoing test are retained by the upper and lower jaws 36 and 37 and moved on around to an ejecting and collecting station, preferably located at the entrance side of the loading station 15 above an opening 158 in the base plate 12, note Figs. 3B and 4B, at which point an ejector roller 159, rotatably mounted on bearings carried by the lower end of a vertically extending rod 160, supported from the upper frame plate 11, successively engages the inner end of each ejector plunger 53 and moves the latter radially outwardly between said jaws to eject the "passing" strips therefrom, said strips falling through the opening 158 into a suitable receptacle or container. Thus all strips which fail to pass the test are ejected by the bell crank arm 110, while the passing strips move on around and are ejected by the roller 159, whereupon the jaws are reloaded with new strips to be tested.

The bar indicated at 161 at the out-going side of the receiving station 15, note Figs. 3 and 3B, is a safety device for automatically stopping the machine should the hand of the operator get caught or for some other reason be caused to move against said bar. It is connected at its upper and lower ends to switch arms which control a pair of normally-closed microswitches 162 and 162′, see also Fig. 7, the latter being wired in series in the circuit of a normally-open brake solenoid 163, which is of the spring-applied type and sets a brake instantly, should the circuit be broken, stopping the drive on the rotor 16. The brake solenoid is also wired into the main power circuit in a manner such that should the power fail or be intentionally interrupted, the brake solenoid 163 will stop the rotor without permitting it to idle under its own momentum.

Since the humidity and temperature of the air in the region of the test chambers affects the resistance of the strips being tested, it is essential that these parameters be maintained at a predetermined value. While the particular type and arrangement of the air-conditioning apparatus form no part of the present invention, a suitable system is shown schematically in Fig. 1 in order to facilitate an understanding of the operation of the testing machine in its entirety. From the block diagram of Fig. 1, it will be noted that the air (which may be partially atmospheric and partially recirculated) is passed through a heater 166, thence through a humidifier 167, to which water is supplied from a suitable source by way of a conduit 168 and float tank 168′, the humidifier including a spray chamber 167′. The air then passes through an air cooler 169, thence through heater 170 and blower 171 to the test chamber section of the machine through conduit 171′. The air is then conducted back to conduit 165 for re-conditioning by way of conduit 172, provided with a control valve 172′. A refrigeration system is generally indicated at 173; it circulates refrigerant around a coil in a primary water cooler 174, the water being pumped through a closed system by means of a motor-pump combination 175, which forces the water through conduit 176 incorporating a cooling coil located in cooler 169. At this point the water absorbs heat from the circulating air, whereupon it is conducted to the primary cooler 174 by way of conduit 177.

The conditioned air enters and leaves the machine by way of a divided hood 179, note Figs. 2 and 3, which covers a section of the machine; and at this section the upper and lower plates 11 and 12 are formed with a series of openings 180 and 181, see also Fig. 3B.

By way of example, the air to be conditioned may be heated to approximately 80° or better, then humidified to approximately 70% relative humidity. In the cooler 169, the air may be brought to a dew point of approximately 58°, and then reheated to a temperature of, for example, 77° in the heater 170. In testing humidity strips for use in telemetering apparatus, the air in the test chamber is maintained at approximately 77° F. and at a relative humidity of approximately 70%.

The members projecting upwardly in the form of rods from the hood 179 in Fig. 2 and indicated at 182 and 183 are wet and dry bulb thermometers, which indicate to an operator the relative humidity of the air in the immediate region of the test chamber. Since the resistance of the strip undergoing test is markedly affected by the relative humidity of the air, it may prove desirable to have a convenient adjustment for correlating the balancing resistance of the bridge circuit in relation to humidity in accordance with a predetermined schedule; and the potentiometer 123 affords a convenient means for obtaining such adjustment without having recourse to the air conditioning controls, which may not respond with sufficient rapidity to return the relative humidity to the desired value.

Fig. 7 illustrates a typical electrical circuit for the air conditioning system and the strip testing apparatus. The various components illustrated in Fig. 7 have been identified by suitable legends in order to render the diagram self-explanatory. The terminal boards and switch mechanism are housed in a box 184, note Fig. 2, having a suitable control panel on which are mounted the usual switch levers and control knobs with their associated dials. In the example illustrated, electrical resistance units supply heat for the air-conditioning system, said units being regulable by adjustable auto transformers T1, T2 and T3.

There may be times when it is desired to test certain of the humidity strips independently of the bridge circuit. To provide for such a contingency, a pair of slip rings 185 and 186, Fig. 3A, are connected to the web plate 50 of the rotor 16 by insulated screw bolts 187 and 188. Brushes 189 and 190 are connected to the lower end of a rod 191 by means of which said brushes are supported from the top plate 11, said brushes being provided with terminals 192 and 193, which may be connected to any suitable test equipment. Whenever it is desired to test any selected humidity strip, the slip rings 185 and 186 are connected to the set of jaws between which the strip is inserted.

*General statement of operation*

The testing machine may be driven or rotated at a rate commensurate with the ability of the operator to feed the strips between the jaws 36 and 37 and the time required for the bridge circuit and coacting mechanism to respond each time a strip is inserted in said circuit. An operator stands at the station 15 and feeds the strips individually between said jaws, and since the upper jaw is spring-pressed towards its "down" or gripping position by the combined spring and conductor 41, the upper jaw may be slightly raised to facilitate insertion of the strip.

The controls for the air conditioning apparatus and the bridge circuit are adjustable to constantly maintain the correct balancing schedule for the strips undergoing test. There may be certain types of resistance elements which are not affected by these parameters, in which event the air-conditioning apparatus would not be required, or it could be turned off.

When testing and sorting humidity strips of the type heretofore briefly described, it is desirable to have the strips progress well into the air-conditioned zone before insertion in the bridge circuit. This gives the strips time to stabilize at the predetermined test temperature and relative humidity. Hence the station for reject strips is located at the termination of the air-conditioned zone, and the contacts 86 and 87 are timed to insert each oncoming set of jaws into the bridge circuit at a point which will result in completion of the test in the test chamber (here chamber 31) immediately preceding the chamber at which the reject solenoid 108 becomes operative.

Preferably, the drive on the machine is continuous rather than intermittent, since actual experience has demonstrated that the machine is capable of establishing a reliable test without having recourse to an intermittent drive. As the rotor 16 moves the strips into the test area, which is constantly being conditioned, the contacts 86′ and 87′ carried by the oscillating plate 85, engage a complementary pair of contacts 72 which are wired to the upper and lower jaws 36 and 37 of an on-coming test chamber, whereupon the strip is automatically inserted in the bridge circuit of Fig. 6, the actual testing period extending through 30° of rotation of the rotor 16 in the particular machine herein illustrated. The bridge may be so adjusted as to permit the motor-driven arm 124′ of the potentiometer 124 to move over a range of, for example, 10° without affecting closure of the high or low limit switches 128 and 129, and which range of movement may correspond to, for example, 4,000 ohms. Should the resistance of the strip be above or below this particular value, the unbalanced voltage, increased in magnitude by the amplifier 126, will cause the arm 124′ to engage either the low or high limit switch and close the latter. However, due to the ejector timing switch 155 and the control means therefor, the circuit to the ejector solenoid 108 will not be closed until the cam 113 of the bell crank lever 110 comes in exact radial registration or alignment with the ejector plunger 53 for the station in which the "reject" strip is located, whereupon the switch 155 is closed and the strip is ejected into a suitable container or onto a conveyor to be carried to a convenient location for reprocessing or other disposition as desired.

After the plate 85 has rotated through 30°, one of the cams 102′ or 102″ engages the roller 101 and actuates the shaft 95, which in turn causes lever 94 to act through the Geneva 91 and rotate the plate 85 back 30° to where the contacts 86′ and 87′ pick up another set of contacts 72, to insert a succeeding humidity strip into the bridge circuit.

While a continuous slip ring or segmental type of contact could be used instead of oscillating the contacts 86′, it is preferred to adopt the oscillating system since this reduces losses incidental to faulty contact engagement and wear and accumulation of foreign matter on the contacts. The net result is a more reliable operation of the test circuit.

All "passing" strips continue on around to the entrance to the feeding station 15, at which point the roller 159, which is held stationary with respect to the rotor ring 16′, engages the inner end of the ejector plungers 53 and successively moves the latter outwardly to eject the strips through the opening 158 and into a receptacle therefor, or onto a conveyor for transporting the strips to a suitable point for packaging, as may be found desirable.

The arm 124′ of the slide wire resistance of potentiometer 124 is operatively connected to a suitable indicator such as the hand 194 of the recorder 127 of Fig. 2, thereby giving a visual indication to the operator at all times of the ohmic reading of the bridge circuit. The particular type of indicator forms no part of the present invention, such devices being available in the open market. If desired, a chart record may be made in addition to a visual indication of variations in resistance on the bridge circuit.

In actual practice, the machine has demonstrated its ability to test humidity strips at a much greater rate and with far more accuracy than is possible with known techniques.

What is claimed and desired to be secured by United States Letters Patent is:

1. In a machine for testing electrical resistors, a movable carrier, a plurality of pairs of spaced conductors mounted in series on said carrier, each pair of conductors being adapted to receive and hold a resistor therebetween, means for driving said carrier in a continuous path, an electrical test circuit, means for electrically inserting said conductors in said circuit, and means for causing said inserting means to intermittently travel a given distance from a pick-up position with said carrier until a test is completed and to then reverse its movement back to the pick-up position to engage a succeeding pair of conductors and repeat the test cycle.

2. A machine as claimed in claim 1 plus means for automatically ejecting the resistors which fail to meet test requirements at one station and those which meet test requirements at another station along the path of movement of said carrier.

3. In a machine for testing electrical resistors, a movable carrier, pairs of spaced conductors arranged in series on said carrier, each pair of conductors being adapted to receive and retain a resistor therebetween, means for driving said carrier in a continuous path, an electrical test circuit, a plurality of contacts, one set for each pair of conductors, mounted on and movable with said carrier, means electrically connecting said contacts to said conductors, a member moving in synchronism with said carrier for a portion of its travel and then moving back to its starting point to repeat the cycle, and a set of contacts carried by said member and electrically connected into said test circuit, said latter set of contacts being adapted to mate successively with said first-named sets of contacts while said member is traveling with said carrier.

4. In a machine for testing electrical resistors, a rotatable carriage, means for driving said carriage, a plurality of coacting sets of gripping jaws arranged in series on said carriage, each pair of jaws being adapted to receive and retain a resistor therebetween, a plurality of contacts rotatable with said carriage and electrically connected to said jaws, an electrical test circuit including a pair of contacts adapted to mate with said first-named sets of contacts, an oscillator member mounting said test circuit contacts, means for oscillating said member in synchronism with the drive on said carriage to cause said test circuit contacts to mate with a set of gripping jaw contacts and move with the latter while a test is being completed and then swing back and pick up a succeeding set of jaw contacts to repeat the test cycle, and means for ejecting said resistors from said jaws after completion of each test.

5. In a machine for testing electrical resistor elements, a rotatable carriage, means for rotating said carriage, a plurality of sets of gripping jaws mounted on said carriage for rotation therewith and accessible exteriorly of the machine to facilitate insertion of resistor elements between said sets of jaws by an operator, a normally balanced electrical bridge test circuit including a member movable in response to changes in the unbalance voltage of the bridge, a plurality of sets of contacts electrically connected to said jaws and disposed for rotation with said carriage, another set of contacts electrically connected into said bridge circuit and so located and organized as to engage a set of jaw contacts and remain in engagement therewith during a test and then move back and pick up a succeeding set to repeat the test cycle, and means for ejecting the resistors which fail to pass the test including an ejector powered by an electrical device controlled by said first-named member.

6. In a machine for testing electrical resistor elements, a rotatable carriage, means for rotating said carriage, said carriage having coacting sets of gripping jaws mounted thereon for rotation therewith and accessible exteriorly of the machine to facilitate the loading of resistors between the jaws by an operator, a normally balanced electrical bridge test circuit including a slide wire resistance and a potentiometer arm movable in response to the unbalance voltage of said bridge, a plurality of sets of contacts electrically connected to said jaws, another set of contacts electrically connected to said bridge circuit, an oscillating member supporting said latter set of contacts, a synchronized drive connection between said carriage and said oscillating member for causing said bridge contacts to mate with a set of said jaw contacts and travel therewith during a test and then move back and pick up a succeeding set of contacts, at least one of the jaws of each set of gripping jaws being movable to facilitate insertion between the jaws of a resistor element to be tested, and means resiliently urging said movable jaw to gripping position.

7. A machine as claimed in claim 6, wherein said means for resiliently urging said jaws to a gripping position comprises a combined electrical conductor and spring member which when its associated jaw is moved into gripping position electrically connects said jaws in the bridge circuit.

8. In a machine for testing electrical resistance elements, a carriage including a rotor having coacting sets of gripping jaws mounted thereon for rotation therewith, means for driving said rotor, said jaws being exposed at the outer periphery of said rotor for loading of the resistor elements to be tested by an operator, a normally balanced electrical bridge test circuit including a potentiometer having an arm movable in response to changes in the unbalance voltage of the bridge, a plurality of sets of contacts electrically connected to said jaws, another set of contacts electrically associated with said bridge circuit, each set of said jaws being included in series in an arm of said bridge circuit when its associated jaw contacts engage said bridge circuit contacts, an oscillating member supporting said bridge circuit contacts, motion-transmitting mechanism interconnected between said rotor drive means and said oscillating member for oscillating the latter in synchronism with said rotor in a manner such as to cause said bridge contacts to mate with a set of said jaw contacts and travel therewith during a test and then move back and pick up a succeeding set of jaw contacts, means for ejecting the resistance elements which fail to pass the test including an ejector powered by an electrical device responsive to movement of said potentiometer arm beyond a predetermined range, and means for also ejecting the "accepted" resistors.

9. A machine as claimed in claim 8, wherein said ejector means for both the "rejected" and "accepted" resistance elements includes a plurality of radially movable plungers which are reciprocable outwardly between said jaws, and the ejecting means for both the rejected and accepted resistors act on said plungers.

10. In a machine for testing electrical resistance elements, a carriage including a rotor having a series of sets of gripping jaws mounted thereon for rotation therewith, means for driving said rotor, a normally balanced electrical bridge test circuit including a slide wire resistance and a potentiometer arm movable in response to changes in the unbalance voltage of the bridge, a plurality of sets of contacts electrically connected to said jaws, another set of contacts electrically connected into said bridge circuit, each set of said jaws being included in series in an arm of said bridge circuit when its associated jaw contacts engage said bridge circuit contacts, a rotatable contact-carrying member connected to said rotor for rotation therewith, said jaw contacts being arranged in pairs on said contact-carrying member, an oscillating member carrying the set of bridge circuit contacts, motion-transmitting mechanism interconnected between said rotor drive means and said oscillating member for causing the latter to oscillate in a manner such as to cause the bridge contacts to mate with a set of said jaw contacts and travel therewith during a test and then move back and pick up a succeeding set of jaw contacts, and means for ejecting the resistors which fail to pass the test including an ejector powered by an electrical device and having associated therewith switch mechanism responsive to movement of said potentiometer arm beyond a predetermined "acceptance" test range, a normally open timing switch interposed between said switch mechanism and said electrical device, and means for closing said timing switch at the completion of each test.

11. A machine as claimed in claim 10, in which said means for closing said timing switch comprises one or more cam members rotatable in synchronism with said contact-carrying member.

12. A machine as claimed in claim 10, wherein means are provided for selectively manually testing a resistor engaged between any one or more sets of said jaws, said means comprising a pair of slip rings adapted to be electrically connected to said jaw contacts and a brush coacting with said slip rings and having terminals adapted to be connected to a manual testing circuit.

13. A machine for testing hygrometers in the form of flat relatively thin humidity strips having electrodes on a pair of opposed edges thereof, a housing, a rotor mounted to rotate within an enclosure defined by said housing, a plurality of sets of gripping jaws mounted for rotation with the rotor and exposed exteriorly of said housing to facilitate loading by an operator, at least one of said jaws being movable and spring-biased towards gripping position, radially projecting partitions providing a plurality of test chambers within each of which a set of jaws is located, a plurality of sets of contacts electrically connected to said jaws, a support on which said contacts are arranged for rotation with said rotor, a normally balanced electrical bridge test circuit including a slide wire resistance and a potentiometer arm movable in response to changes in the unbalance voltage of the bridge, said jaws being adapted for inclusion in series in an arm of said bridge circuit, another set of contacts electrically associated with said bridge circuit, an oscillating member supporting said latter set of contacts, means for oscillating said member in synchronism with said rotor to cause said test circuit contacts to mate with a set of said jaw contacts and travel therewith during a test and then move back and pick up a succeeding set of jaw contacts, means for ejecting humidity strips which are "rejected" by the test circuit including an ejector member powered by an electrical device having an electrical circuit incorporating switch mechanism responsive to movement of said potentiometer arm, and means for also ejecting the strips which are "accepted" by said test circuit.

14. A machine as claimed in claim 13, wherein said ejecting means includes a plurality of plungers mounted for radial movement outwardly between said jaws, said plungers being biased towards a non-ejecting position, and said electrical device for powering the "rejected" strip ejector is in the form of an electrical solenoid having an operative connection to a member acting on said plungers.

15. In a machine for testing electrical resistors, a rotatable carriage, means for rotating said carriage, said carriage having coacting sets of gripping jaws mounted thereon for rotation therewith, a normally-balanced electrical bridge test circuit including a potentiometer arm, means responsive to the unbalance voltage of said bridge for moving said arm, a plurality of sets of contacts electrically connected to said jaws, another set of contacts electrically connected into said bridge circuit, means for causing said set of bridge contacts to successively engage and disengage said jaw contacts during rotation of the carriage, means for ejecting the resistors which fail to pass a test including an ejector member, electrical means for powering said member, said potentiometer arm having associated therewith limit switches connected in circuit with said electrical means and located for actuation by said arm should it move beyond a predetermined range determined by the "passing" resistance of the resistor elements undergoing test.

16. In a machine for testing electrical resistor elements, a rotatable carriage, means for rotating said carriage, a plurality of sets of gripping jaws mounted on said carriage for rotation therewith and accessible exteriorly of the machine to facilitate insertion of resistor elements between said sets of jaws by an operator, a normally-balanced electrical bridge test circuit including a member movable in response to changes in the unbalance voltage of the bridge, a plurality of sets of contacts electrically connected to said jaws and disposed for rotation with said carriage, another set of contacts electrically connected into said bridge circuit, means for causing the set of bridge contacts to engage a set of jaw contacts at a pick-up position and remain in engagement therewith during a test and then move back to the pick-up position and engage a succeeding set of jaw contacts to repeat the test cycle, means for ejecting the resistors which fail to pass a test including an ejector powered by an electrical device responsive to movement of said first-named member, and means for maintaining the space within which the carriage rotates at a predetermined temperature and relative humidity.

17. In a machine for testing electrical resistor elements, a rotatable carriage, means for rotating said carriage, said carriage having coacting sets of gripping jaws mounted thereon for rotation therewith and accessible exteriorly of the machine to facilitate the loading of resistors between the jaws by an operator, a normally-balanced electrical bridge test circuit, a plurality of sets of contacts electrically connected to said jaws, another set of contacts electrically connected to said bridge circuit, an oscillating member supporting said latter set of contacts, a synchronous drive connection between said carriage and said oscillating member for causing said bridge contacts to mate with a set of jaw contacts and travel therewith during a test and then swing back and pick up a succeeding set of jaw contacts, at least one of said gripping jaws being movable to facilitate insertion of a resistor element between the jaws, a bridging resistor electrically connected in series with switching contact means across said jaws and having a value such as to prevent the bridge from swinging to a high unbalance when the jaws are unloaded, and means resiliently urging said jaws to gripping position including a combined spring member and electrical conductor operatively associated with said movable jaw, said spring member when its associated jaw is moved into gripping position functioning to open said switching contact means and automatically cut said bridging resistor out of the bridge circuit.

18. In a machine for testing hygrometers in the form of flat relatively thin humidity strips having electrodes on a pair of opposed edges thereof, a housing, a rotor mounted to rotate within an enclosure defined by said housing, a plurality of sets of gripping jaws mounted for rotation with the rotor and exposed exteriorly of said housing to facilitate loading by an operator, radially projecting partitions carried by the rotor and providing a plurality of test chambers within each of which a set of jaws is located, means for maintaining said test chamber at a predetermined temperature and relative humidity, a plurality of sets of contacts electrically connected to said jaws and movable with the latter, an electrical test circuit, another set of contacts electrically connected into said test circuit, an oscillating support for said test circuit contacts, and means for operating said support in a manner such as to cause the bridge contacts to mate with a set of jaw contacts and travel therewith during a test and then swing back and pick up a succeeding set of jaw contacts to repeat the test cycle.

19. A machine as claimed in claim 18 wherein said electrical test circuit comprises a normally-balanced bridge having a slide wire resistance and an arm movable along said resistance in response to bridge unbalance voltage, and means are provided for ejecting the humidity strips which fail to pass the test including an ejector powered by an electrical device controlled by said arm.

20. In a machine for testing electrical resistors, a movable carriage, means for moving said carriage in a continuous path, pairs of spaced gripping jaws arranged in series on said carriage and adapted to receive and retain a resistor therebetween during a testing operation, at least one of the jaws of each pair being movable to facilitate insertion of a resistor therebetween, an electrical bridge test circuit, each pair of jaws having operatively associated therewith a set of contacts which travel with said carriage, a pair of contacts electrically connected into said bridge circuit, means for causing said bridge circuit contacts to mate with a set of jaw contacts and remain in engagement therewith while a test is being completed and then move back in a direction counter to the direction of travel of the carriage and pick up a succeeding set of jaw contacts to repeat the test cycle, a bridge resistor electrically connected across said jaws, said bridge resistor being of a value such as to prevent a relatively high unbalance of the bridge when said jaws are unloaded, and electrical contact means for cutting said bridge resistor into and out of the circuit, said last-named means being responsive to movement of at least one of said jaws whereby when the jaws are moved into gripping position with a resistor being tested said bridge resistor is cut out of the bridge circuit and when a tested resistor is removed from said jaws the bridge resistor is automatically cut into the bridge circuit.

References Cited in the file of this patent

UNITED STATES PATENTS

| | | |
|---|---|---|
| 2,016,455 | Purdy | Oct. 8, 1935 |
| 2,362,691 | Gaiser | Nov. 14, 1944 |
| 2,417,488 | Handforth et al. | Mar. 18, 1947 |
| 2,468,843 | Sunstein | May 3, 1949 |
| 2,546,314 | Merwin | Mar. 27, 1951 |
| 2,567,741 | Smith | Sept. 11, 1951 |